Nov. 1, 1966  J. H. WHEELER  3,282,594
SWIVEL SEAL

Filed July 9, 1964  2 Sheets-Sheet 1

JOHN H. WHEELER
INVENTOR.

BY D. Carl Richards

ATTORNEY

Nov. 1, 1966  J. H. WHEELER  3,282,594
SWIVEL SEAL
Filed July 9, 1964  2 Sheets-Sheet 2
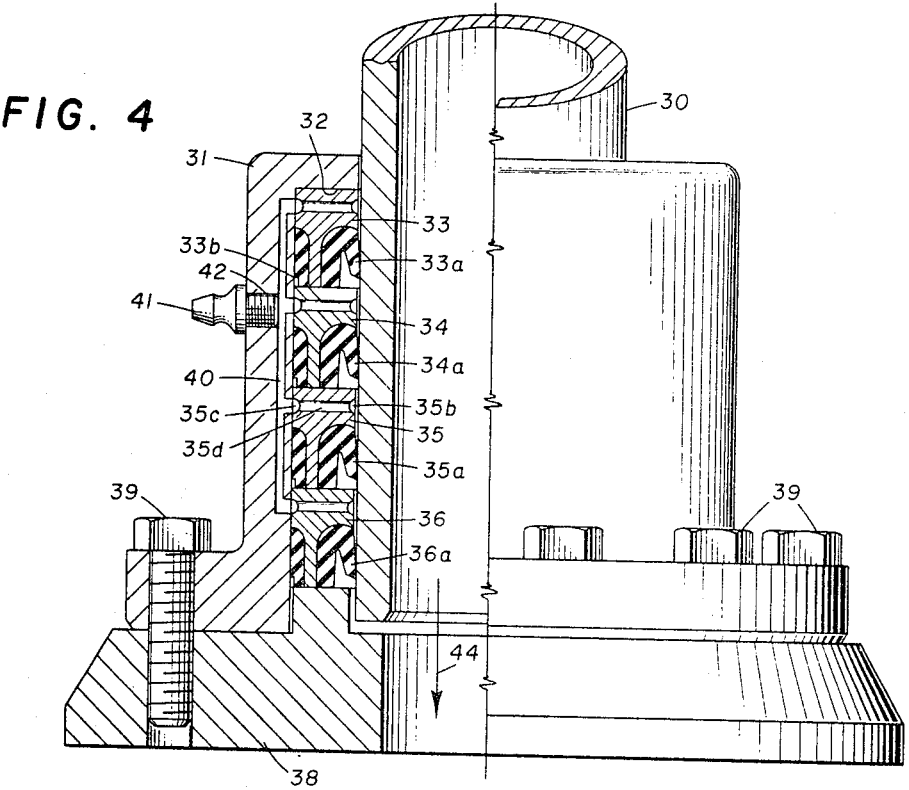
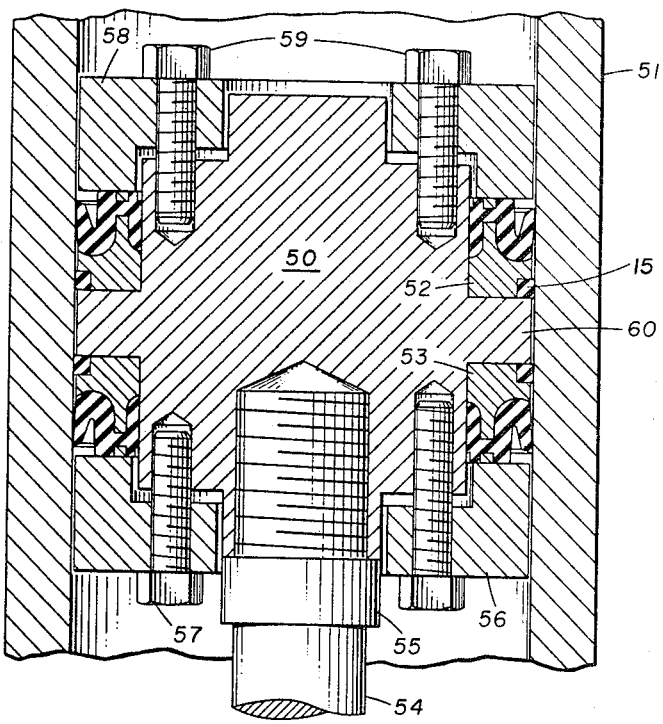
JOHN H. WHEELER
INVENTOR.
BY *D. Eure Richards*
ATTORNEY 3,282,594
SWIVEL SEAL
John H. Wheeler, P.O. Box 10823, Dallas, Tex.
Filed July 9, 1964, Ser. No. 381,374
8 Claims. (Cl. 277—68)

This application is a continuation-in-part of application Serial No. 241,882, filed December 3, 1962, now abandoned.

This invention relates to a sealing unit and, more particularly, to an axial force-transmitting sealing unit particularly useful in conduit swivels and in plunger-type units employed with pressurized fluids.

Different types of packing systems have been employed in packing glands to seal two members against passage therebetween of a fluid maintained under compression while permitting movement of one of the members relative to the other. Such devices are known in pumps and in various shaft arrangements where entry must be made from a zone maintained under one pressure to a zone under a different pressure. The problem is particularly significant in connection with the sealing of the members of swivel units in oil well drilling operations where high pressure mud systems must communicate between a stationary tank adjacent to a drilling rig and the drill stem which must be maintained under substantially continuous rotation during the drilling operation. Swivels, in such environments, are required to withstand substantial abrasive forces which, in general, will not permit the use of metal-to-metal sealing members. Rubber or resilient-type sealing members have been employed because of their ability to withstand wear and at the same time eliminate the fine tolerances on metal-to-metal fitting members. However, there has been found to be present a problem involving the ability to equalize the forces present on several units in a packing gland. Ordinarily, the sealing members are placed under compression in an axial direction to distend or distort the members to maintain them in contact with the relatively movable elements to be sealed.

Packing members known as Chevron packings ordinarily are installed as a stack in a gland and are then compressed to force them outward into contact with the walls of the gland and a shaft or cylinder passing through the gland. The application of force axially of the gland causes some of the members in the stack initially to be placed under greater stress than the other members. That is, application of the compressive force to one end of the stack causes initial distortion of the members of the stack adjacent the compression end before any substantial force is transmitted to members at the other end. As the distortion increases, the tendency to transmit the setting force decreases so that the member immediately adjacent the compression end is under far greater initial stress than any of the other members. As a result, wear along the stack of packing members is nonuniform with the member nearest the compression end carrying substantially all of the load until it wears to the point that succeeding members come into play.

It is an object of the present invention to provide a seal which will eliminate nonuniform distribution of the setting forces in a gland.

It is a further object of the invention to provide a packing ring which will eliminate guesswork in setting the packing and which will provide substantially a metal-to-metal contact throughout the length of the stack of seals so that there will be uniform initial stress on all of the members of a stack of seals.

The present invention is directed to a seal or packing ring which will permit the ring to sustain substantial axially directed forces while assuring contact with the surfaces of a movable member such as a shaft or an inner swivel element. The sealing member of the present invention is adapted to provide a seal either in a rotating or translating cylindrical system.

More particularly, in accordance with the present invention, there is provided a sealing member which includes a rigid ring with an upstanding right cylinder integral with the ring and of diameter intermediate the inner and outer diameters of the ring and having radially directed ports through the walls thereof. A resilient ring-shaped body is molded to the upper surface of the ring and to the sides of the cylinder. The resilient body has a lip extending inwardly of the ring and an outer diameter normally coinciding with the ring but extends above the cylinder for deformation outwardly when the ring and cylinder are placed under compressive forces.

In a more specific and preferred embodiment of the invention, the resilient member is fiber-reinforced with the fibers being extruded through the ports in the cylinder to unify the inner and outer sections of the resilient body. Still further, one boundary between the ring and the cylinder forms an upfacing curved seat for a portion of the resilient member.

For a more complete understanding of the present invention and for further objects and advantages thereof, reference may now be had to the following description taken in conjunction with the accompanying drawings in which:

FIGURE 4 illustrates an installation employing a plurality of devices of FIGURE 3; and FIGURE 5 illustrates a second modification of the invention.

Figure 1:
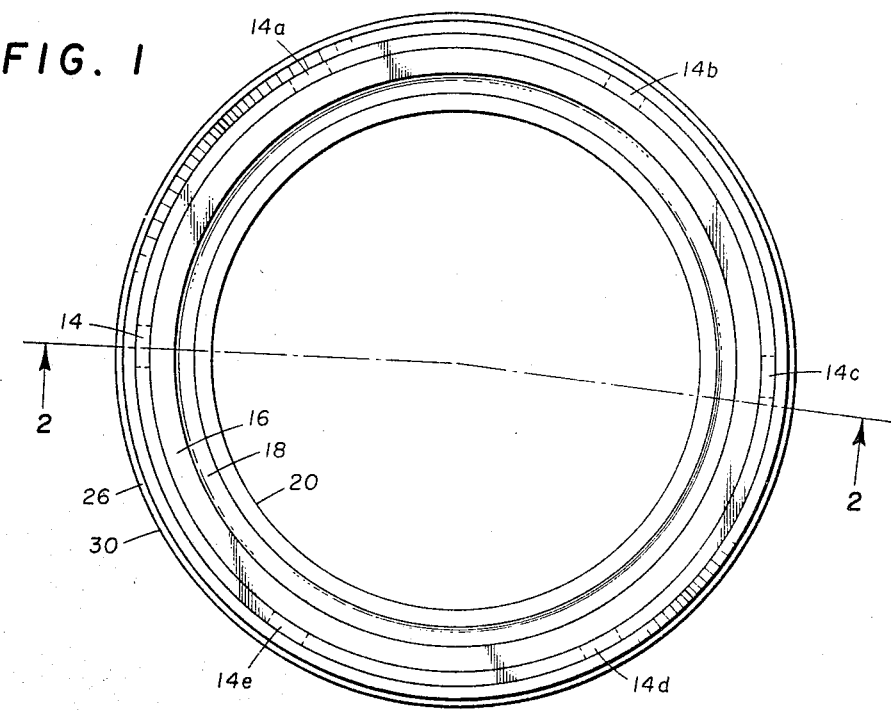
FIGURE 1 is a top view of one embodiment of the seal of the present invention.
Figure 2:
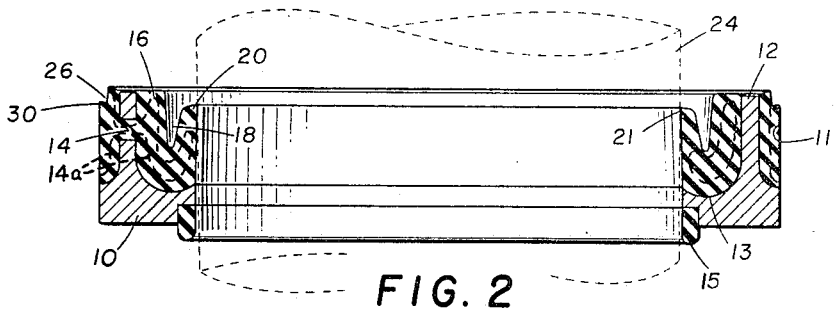
FIGURE 2 is a sectional view taken along line 2—2 of FIGURE 1.

Referring now to FIGURES 1 and 2, a ring 10 is illustrated which is a flat-bottomed metallic ring having an outside diameter slightly smaller than the inside diameter of a packing gland into which the ring is to be fitted. The dimensions are made such that the ring will slip readily into a cylindrical recess. The ring 10 has integrally formed therewith a right cylinder 12 which extends upwardly from the ring 10 and is relatively thin-walled. Cylinder 12 is secured to the ring 10 at a point intermediate the inner and outer diameters of the ring 10. In the embodiment best seen in FIGURE 2, the cylinder 12 is positioned closer to the outer edge of ring 10 than to the inner edge. The cylinder 12 joins to the ring 10 with an arcuate and substantially continuous surface, particularly in the area 13. Thus, there is formed an upfacing annular groove at the inner juncture of the cylinder 12 and the ring 10. The outer surface of the ring 10 is joined to the cylinder 12 with fairly small diameter fillets. The structure thus employed may readily be formed by die-casting techniques with the fillets between the ring 10 and cylinder 12 providing for withstanding substantial pressure.

The cylinder 12 is perforated as at the perforation 14. A plurality of such perforations are provided around the perimeter of the cylinder 12. As best seen in FIGURE 1, six such perforations are identified by reference characters 14, 14a–14e. The ports or perforations 14–14e are, in this embodiment, oval-shaped and are uniformly spaced around the cylinder.

A resilient body 16 is molded onto the upper surface of the ring 10 and to both the inner and outer surfaces of the cylinder 12. More particularly, the inner portion of the resilient body 16 has a relatively thick-walled section adjacent to the walls of the cylinder 12 and is characterized by a fairly deep groove 18 so that an inwardly directed lip 20 is formed. The inner wall 21 of the lip 20 extends inwardly beyond the inner diameter of the ring 10 so that it will engage the wall of a shaft or cylindrical member extending therethrough as represented by the dotted lines 24.

Where the resilient body 16 is provided with fabric therein during the molding operations, the fabric therein will be extruded through the perforations in the cylinder 12 for unifying the inner and outer sections of the resilient body.

The outer wall of the resilient body 16 is of the same diameter as the outer wall of the ring 10 and extends upwardly to a point adjacent the top of the cylinder 12. A portion of the resilient body 16 extends slightly above the top of the cylinder 12 with a notch 26 being formed in the upper and outer margin of the resilient body 16. The upper surface of the body 16 slopes downwardly to a point closely adjacent the upper surface of the cylinder 12. By this means, the unit may be placed under compression so that the portion 30 of the resilient body 16 will be deformed and forced outwardly into a sealing engagement with the walls of an enclosing recess.

More particularly, as shown in FIGURE 2, fabric constituents 14a are extruded through the perforations 14 to unify the inner and outer sections of the resilient body.

The presence of the groove 18 inside the lip 20 permits or facilitates a self-sealing action by reason of the action of pressurized fluids in the groove 18. Such pressure forces the lip 20 into firm contact with the walls 24 of a shaft.

A rectangular annular recess is formed in the lower inner corner of the ring 10. A rubber ring 15 is secured therein. The ring 15 serves, along with the lip 21, to contact the opposed wall of the shaft 24. The ring 15 when placed under compression is formed inward into contact with the surface of shaft 24 to provide an additional sealing contact.

With the structure thus far described, a single ring may be employed for a given installation. Alternatively, several of the rings may be employed in a given installation with all of the rings under uniform compression. By providing the upstanding ridge above the cylinder 12, it is possible to make the sealing member 16 of outer diameter slightly less than the recess into which it fits and yet, upon locking the same therein, the resilient member 16 will be forced out into intimate engagement with the enclosing walls.

Figure 3:
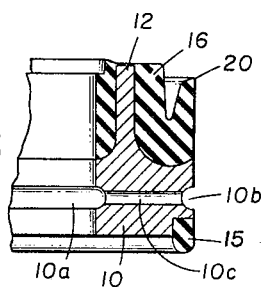
FIGURE 3 illustrates a modification of the seal of FIGURE 2.

In FIGURE 3 there is illustrated a modification of the invention in which the seal is adapted to be mounted on a mandrel with the sealing lip 20 facing outwardly for engagement with the walls of an enclosure. The embodiment of FIGURE 3 is substantially the reverse of the device shown in FIGURE 2. However, an additional feature is incorporated in FIGURE 3. More particularly, the bottom ring 10 is made of substantially greater height so that, if desired, a lubricating channel may be formed therein to permit individual lubrication of each sealing member that may be installed in the stack. For this purpose, a groove 10a is formed on the inner surface of the ring, a groove 10b is formed on the outer surface of the ring, and a hole 10c is bored through the ring 10 to provide communication between the grooves 10a and 10b. As will hereinafter be described, a plurality of holes such as the hole 10c may be formed through the ring so that communication will be provided at spaced points around the circumference of the ring. It will be appreciated that although the device of FIGURE 3 has been illustrated with the ring 15 and the lip 20 on the outside, it may be formed on the inside as in FIGURE 2 with the lubricating features included. Such an installation employing a plurality of seals is shown in FIGURE 4.

In FIGURE 4 a tube 30 extends downward into a housing 31. A recess 32 is formed in the housing 31 into which there is fitted a plurality of seals 33, 34, 35 and 36. The zone inside the tube 30 and housing 31 is under substantially higher pressure than outside the housing. The seals 33–36 are inserted into the recess 32 and are then placed under compression by a sealing member 38 which is secured to the housing 31 by bolts 39 arrayed around the circumference of the member 38. The bolts 39 are tightened down such that there is substantially metal-to-metal contact throughout the length of the stack of seals 33–36. In this embodiment, each of the lips 33a, 34a, 35a and 36a maintain contact with the surface of the tube 30. The compression of the seals 33–36 forces the lower outer shoulder, such as shoulder 33b, outward against the wall of the recess 32. There extends along the wall of recess 32 a channel 40. Each of the seals 33–36 has inner and outer grooves such as grooves 35b and 35c. Communication between grooves 35b and 35c and 35c is had by way of hole 35d. A grease fitting 41 is mounted on the outside of the housing 31 and communicates with the channel 40 by way of a hole 42. Thus, the communication provided through the base of the seals 33–36 provides for individual lubrication of the elements 33–36.

In the embodiment illustrated in FIGURE 4, the units 34–36 are stacked one above the other. In this embodiment, the auxiliary sealing ring 15 has been omitted. If desired, a washer may be inserted between rings 33 and 34, a second washer between rings 34 and 35, and a third washer between rings 35 and 36. Auxiliary sealing rings 15 may then be included. With this construction, they will be placed under compression by the washers for contact with the walls of the pipe 30.

The installation illustrated in FIGURE 4 is one in which the tube 30 may rotate inside the housing 31. The structure illustrated in this figure forms a part of the connection between a wash pipe extending below a housing element 38 and a hose coupled to tube 30 leading to a pump for washing liquids. In this system the housing element 38 rotates relative to the tube 30 with fluids flowing under pressure in the direction of arrow 44. Structure not shown is ordinarily provided for preventing the tube 30 from being retracted from the housing 31. However, the system has been shown in detail in the area in which the seals 33–36 are employed in order to illustrate this application of the invention.

In FIGURE 5 there is illustrated a system in which a piston 50 is mounted in a piston housing 51. The piston is provided with a pair of seals 52 and 53. The seals 52 and 53 are of the character illustrated in FIGURE 3 and are mounted on the piston 50 in a back-to-back relationship so that they provide a compression seal in both directions. The piston shaft 54 is provided with a shoulder portion 55 which bears against the lower end of the piston 50.

A compression ring 56 is secured to the lower end of the piston 50 by bolts 57 and bears against the lower end of the seal 53. Similarly, a compression ring 58 places the seal 52 under compression by action of the bolts 59. The seals 52 and 53 are seated on shoulder portion 60 of the piston 50 with rings 15 under compression. In this embodiment, it will be readily recognized that the metal-to-metal contact provided by the cylinder on each of the seals 52 and 53 would permit the elimination of the shoulder 60 and one of the rings 56 and 58. Since the seals themselves may withstand compression forces, only one compression ring would be needed. However, in either event, in such device the piston 50 reciprocates in the piston housing 51 and the seals 52 and 53 maintain a pressure-tight relationship in both directions. It will be appreciated that the sealing members 52 and 53 may be increased in number and may be stacked in alternate directions or in the same direction as any particular installation demands.

In a preferred embodiment of the invention, the seal is provided with the rigid ring and cylinder portions thereof formed from a metal such as may be provided through die-casting techniques. The fillets provided at the point of juncture between the ring and cylinder will permit the application of substantial forces in the die-casting operation. However, the form element may be machined as by lathe or other suitable machine tools, in which case the fillet characteristic of the devices of FIGURES 2 and 3 would not be necessarily included.

Further, it is to be understood that while metal bodies are preferred, the seal can be made of suitable rigid, heat-resistant solids such as resins or other substances which will provide resistance to compressive forces and to which the resilient member may be secured.

Having described the invention in connection with certain specific embodiments thereof, it is to be understood that further modifications may now suggest themselves to those skilled in the art and it is intended to cover such modifications as fall within the scope of the appended claims.

What is claimed is:
1. A seal which comprises:
   (a) a flat-bottomed rigid ring having an upfacing curved groove in the upper surface thereof,
   (b) a rigid upstanding right cylinder integral with said ring and of diameter intermediate the inner and outer diameters of said ring and adjacent to one side of said groove, and
   (c) a resilient body seated in said groove and molded to the upper surface of said ring and to the sides of said cylinder with a cylindrical lip extending upward from and outward beyond one wall of said ring on one side of said cylinder at a point below the top of said cylinder, and on the other side of said cylinder extending above said cylinder and of diameter equal the diameter of said ring on said other side of said cylinder for deformation away from said other side beyond said diameter when placed under compression.
2. A seal which comprises:
   (a) a flat-bottomed rigid ring having an upfacing curved groove in the upper surface thereof,
   (b) a rigid upstanding right cylinder integral with said ring and of diameter intermediate the inner and outer diameters of said ring and having radially directed ports through the walls thereof and being adjacent to one side of said groove, and
   (c) a resilient body seated in said groove and molded to the upper surface of said ring and to the sides of said cylinder with a cylindrical lip extending upward from and outward beyond one wall of said ring on one side of said cylinder and terminating at a point below the top of said cylinder, and on the other side of said cylinder extending above said cylinder and of diameter equal the diameter of said ring on said other side of said cylinder.
3. A seal which comprises:
   (a) a flat-bottom rigid ring having a curved groove in the upper surface thereof,
   (b) a rigid upstanding right cylinder integral with said ring and adjacent to said groove and of diameter intermediate the inner and outer diameters of said ring, and
   (c) a resilient ring-shaped body seated in said groove molded to the upper surface of said ring and to the sides of said cylinder with a cylindrical lip extending inwardly of said ring and terminating at a point below the top of said ring and an outer diameter normally coinciding with said ring and extending above and on the outside of said cylinder for deformation outwardly when said ring and cylinder are placed under compression.
4. A seal which comprises:
   (a) a flat-bottomed rigid ring having an upfacing curved groove in the upper surface thereof,
   (b) a rigid upstanding right cylinder integral with said ring and adjacent to said groove and of diameter intermediate the inner and outer diameters of said ring, and
   (c) a resilient ring-shaped body seated in said groove molded to the upper surface of said ring and to the sides of said cylinder with a cylindrical lip extending outwardly of said ring and terminating at a point not higher than the top of said ring and an inner diameter normally coinciding with said ring and extending above and inside said cylinder for deformation inwardly when said ring and cylinder are placed under compression.
5. The combination set forth in claim 1 in which said cylinder is of diameter much nearer the diameter of said ring on said other side than on said one side.
6. The combination set forth in claim 1 in which an auxiliary resilient ring is mounted at a bottom corner of said ring on the side of said cylinder corresponding with said groove.
7. The combination set forth in claim 2 in which said resilient body is fabric reinforced with fabric constituents thereof being extruded through said ports in said cylinder for unifying said inner and outer sections of said resilient body.
8. A seal which comprises:
   (a) a flat-bottomed metallic ring having a curved groove in the upper surface thereof,
   (b) a metallic upstanding right cylinder tangent to said groove and of diameter intermediate the inner and outer diameters of said ring and having radially directed ports through the walls thereof, and
   (c) a resilient ring-shaped body seated in said groove and molded to the upper surface of said ring and to the sides and top of said cylinder and the surfaces of said ports and characterized by an inwardly directed cylindrical lip terminating below the top of said ring and an outer diameter normally coinciding with the outer diameter of said ring and extending above and outside said cylinder for deformation outwardly when said ring and cylinder are placed under compression.

References Cited by the Examiner
UNITED STATES PATENTS

| | | | |
|---|---|---|---|
| 2,417,828 | 3/1947 | Joy | 277—75 |
| 2,485,940 | 10/1949 | Tremolada | 277—68 X |
| 2,586,871 | 2/1952 | Shields | 277—70 X |
| 2,679,441 | 5/1954 | Stillwagon | 277—188 X |
| 2,687,335 | 8/1954 | Bowerman | 277—188 X |
| 2,808,301 | 10/1957 | Bowerman | 277—188 X |
| 3,013,826 | 12/1961 | Sharp | 277—68 X |
| 3,210,087 | 10/1965 | Mayer | 277—125 |

FOREIGN PATENTS 561,321   5/1944   Great Britain.

SAMUEL ROTHBERG, *Primary Examiner.*